United States Patent [19]

Gabrielson et al.

[11] Patent Number: 5,670,571

[45] Date of Patent: Sep. 23, 1997

[54] PROCESS FOR PRODUCING A DISPERSED NOVOLAC RESIN AND USE IN A BINDER SYSTEM FOR THERMAL INSULATION

[75] Inventors: Kurt D. Gabrielson, Puyallup; Rodney R. Conner, Fox Island, both of Wash.

[73] Assignee: Georgia-Pacific Resins, Inc., Atlanta, Ga.

[21] Appl. No.: 552,563

[22] Filed: Nov. 3, 1995

[51] Int. Cl.$^6$ .................................... C08L 61/06

[52] U.S. Cl. .................. 524/604; 524/593; 524/594; 524/596

[58] Field of Search .................. 524/593, 594, 524/596, 604

[56] References Cited

U.S. PATENT DOCUMENTS

| | | | |
|---|---|---|---|
| 3,862,060 | 1/1975 | Anderson et al. | 524/25 |
| 4,011,186 | 3/1977 | Higginbottom | 523/340 |
| 4,026,848 | 5/1977 | Harding et al. | 524/28 |
| 4,039,525 | 8/1977 | McCarthy, Jr. | 524/55 |
| 4,060,504 | 11/1977 | Higginbottom | 524/25 |
| 4,748,214 | 5/1988 | Asami et al. | 525/503 |
| 4,788,236 | 11/1988 | Kopf | 524/55 |

*Primary Examiner*—Paul R. Michl
*Assistant Examiner*—John J. Guarriello
*Attorney, Agent, or Firm*—Banner & Witcoff, Ltd.

[57] ABSTRACT

An aqueous dispersion of small particles of a phenol/formaldehyde novolac resin, referred to as a dispersed novolac resin, useful for example as a binder in preparing glass fiber insulation. The dispersed novolac resin is produced by preparing a molten novolac resin, cooling, adding water and optionally a surfactant and then adding a protective colloid. Additional water is added to provide the desired dispersion.

11 Claims, No Drawings

PROCESS FOR PRODUCING A DISPERSED NOVOLAC RESIN AND USE IN A BINDER SYSTEM FOR THERMAL INSULATION

This invention relates to an aqueous dispersion of small particles of a phenol/formaldehyde novolac resin, referred to as a dispersed novolac resin, useful for example as a binder in preparing glass fiber insulation. The invention is more particularly directed to a method of making such an aqueous dispersion by emulsifying a molten novolac in water and allowing the emulsified, molten resin to cool.

BACKGROUND OF THE INVENTION

The prior art discloses procedures for preparing stable aqueous dispersions of resole resins. Resole resins are characterized by having terminal reactive methylol groups and significant ether linkages along the oligomeric backbone. For example, U.S. Pat. No. 4,060,504 relates to emulsifiable resoles prepared by a two-stage reaction comprising an acid stage wherein phenol and formaldehyde and oxalic acid are condensed to form a phenol-formaldehyde condensate (novolac resin) product and then a base stage wherein the cooled condensate product is converted to a resole resin by addition of formaldehyde under basic conditions. The resole resin is then neutralized and an emulsifier is added to produce a stable resole resin emulsion. The resole resin emulsion is useful as a binder for thermal insulation (column 4, lines 64–66).

U.S. Pat. No. 3,862,060 provides stable emulsions containing high concentrations of thermosetting phenol-formaldehyde resole resins as the dispersed phase. The resins are prepared by condensing formaldehyde with phenol in the presence of a basic nitrogenous catalyst. The emulsification system includes alkali solubilizable proteinaceous compounds, such as casein and soya protein (column 4, lines 46–55).

U.S. Pat. No. 4,026,848 is directed to an aqueous phenolic resole resin dispersion produced in the presence of gum ghatti and a thickening agent, such as guar gum. U.S. Pat. No. 4,039,525 relates to aqueous phenolic resole dispersions which are produced in the presence of certain hydroxylated gums as interfacial agents, said gums including gum arabic, locust bean gum and stractan gum (column 4, lines 32–36).

U.S. Pat. No. 4,748,214 discloses a process for producing microspherical cured phenolic resin particles having a particle diameter of not more than about 100μ comprising reacting a novolac resin, a phenol and an aldehyde in an aqueous medium in the presence of a basic catalyst and an emulsion stabilizer. Preferred protective colloids for the emulsion stabilizer include gum arabic (column 4, lines 8–10).

There has been little activity in preparing stable aqueous dispersions of novolac resins. Novolac resins are characterized by methylene linkages along the oligomeric backbone and an absence of terminal reactive groups. It is not obvious that procedures and materials used to produce resole dispersions could be used for dispersing a novolac resin. U.S. Pat. No. 4,788,236, for instance, is directed to a process for producing particulate novolac resins and aqueous dispersions thereof. Phenol is condensed with aldehyde using an acid catalyst to produce a phenolic resin. Water is added to enable the subsequent production of a dispersion resin. Suitable acid catalysts include oxalic acid. Following an essential step of neutralization, a particulate novolac resin is formed by adding a protective colloid to the aqueous mixture. U.S. Pat. No. 4,788,236 teaches that a particulate novolac resin is formed only by the use of certain polysaccharides as protective colloids, such as gum arabic and guar gum (Table I). In particular, it is noted that certain materials used as protective colloids for making resole resins are not necessarily suitable for providing particulate novolacs. Further, U.S. Pat. No. 4,788,236 stresses that the dephenolation step must be conducted after the particulate formation step in order to obtain small particle sizes.

SUMMARY OF THE INVENTION

The present invention is directed to a process for producing a dispersed novolac resin, comprising the steps of:

(a) reacting a phenol with an aldehyde in the presence of a catalyst under acidic conditions to produce a novolac resin;

(b) heating the novolac resin to remove water, unreacted phenol, and other volatile organic materials from the novolac and to produce a molten novolac resin;

(c) cooling the molten novolac resin to a point where water can be added;

(d) adding about 10–30 wt % of water, based on the total novolac resin solids, and optionally a surfactant, to the molten resin in an amount sufficient to produce a water-in-oil emulsion;

(e) adding a protective colloid to the emulsion in an amount sufficient to stabilize the dispersed particulate novolac resin;

(f) adding additional water to produce the dispersed particulate novolac resin, whereby the particulate novolac resin has a particle size of 0.1μ to 20μ; and (g) optionally, adding a thickener to further stabilize the dispersed particulate novolac resin.

Further, the present invention is directed to a process for producing a binder for insulation, comprising adding a cross-linking agent either to the molten resin in step (c) or to the final dispersed novolac resin.

The present invention is also directed to a dispersed phenol/aldehyde novolac resin which is formed by emulsifying a molten novolac resin in water with an emulsifier in accordance with the above-described procedure, resulting in a dispersion of novolac particles predominantly in the range of 0.1μ to 20μ.

In addition, the present invention is directed to a dispersed novolac resin which upon cross-linking is useful, for example, as a binder for glass fibers, such as for the manufacture of glass fiber insulation.

Additional advantages of the invention will be set forth in part in the description which follows, and in part will be apparent from the description, or may be realized and obtained by means of the elements and combinations particularly pointed out in the claims.

It is to be understood that both the foregoing general description and the following detailed description are exemplary and explanatory only and are not restrictive of the present invention as claimed.

DETAILED DESCRIPTION OF THE INVENTION

The novolac phenolic resins used to produce the dispersed novolac resin of the present invention are obtained by reacting a phenol with an aldehyde in the presence of an acid catalyst.

Specific examples of suitable phenols for preparing the novolac resin composition of the present invention include: hydroxy benzene (phenol), o-cresol, m-cresol, p-cresol, resorcinol, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol, naphthol, anthranol, and substituted derivatives thereof.

Substituted phenols which optionally can be employed in the formation of the phenolic resins include alkyl substituted phenols, aryl substituted phenols, cycloalkyl substituted phenols, alkenyl-substituted phenols, alkoxy substituted phenols, aryloxy substituted phenols, and halogen-substituted phenols, the foregoing substituents possibly containing from 1 to 26, and usually from 1 to 9, carbon atoms. Substituted phenols include 2,2-bis(4-hydroxy-phenol)-propane ("bisphenol-A"), p-chlorophenol, and p-t-butyl phenol.

Included among the phenolic reactants which may be used are those known as the "cresylic acids" and these often comprise heterogeneous mixtures having only two reacting hydrogen positions on each of them; that is, compounds unsubstituted in the ortho- and para-positions, and hence, yield relatively unreactive resins. These compounds may include the following: 3,5-xylenol, m-cresol, 3,4-xylenol, 2,5-xylenol, 2,3-xylenol, phenol, p-cresol, o-cresol, 2,4-xylenol, and 2,6-xylenol. Cresylic acids or tar acids may include phenol and its homologs which include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydrogenation products, and the like.

The aldehyde can be one aldehyde used alone or in combination with other aldehydes, which include any of the wide variety of aldehydes or their equivalents heretofore employed in the formation of phenolic novolac resins including, for example, formaldehyde, acetaldehyde, propionaldehyde, butyraldehyde, ethylbutyraldehyde, heptaldehyde, 2-ethylhexanal, crotonaldehyde, furfuraldehyde, and benzaldehyde. In general, the aldehydes employed have the formula R'CHO wherein R' is a hydrogen or a hydrocarbon radical generally of 1–8 carbon atoms. It will be appreciated that some aldehydes, e.g., acetaldehyde and butyraldehyde, improve toughness of the novolac resin at the expense of lowering the HDT thereof (heat distortion temperatures, as determined by American Society for Testing and Materials ASTM D-648). Also it is contemplated that difunctional aldehydes can be used to prepare the phenolic resin, and could advantageously be used to introduce cross-links ultimately into the cured resin.

Ordinary phenol (hydroxy benzene) and ordinary formaldehyde are preferred for most applications. The remaining description will specify phenol and formaldehyde, since these are the preferred reactants. However, it is to be understood that any appropriate phenol and aldehyde components may be used and are within the scope of the present invention.

Formaldehyde can be supplied in any one of its commonly available forms including formalin solutions and paraformaldehyde. Generally, solutions of 50% formaldehyde are used.

Preparing a novolac resin for use as a dispersed novolac resin in accordance with the present invention is within the skill of the art. The mole ratio of formaldehyde to phenol to prepare a novolac resin is also within the skill of the art and is preferably about 0.5 to 0.95 and, more preferably, about 0.7 to 0.83.

The reaction between the phenol and the formaldehyde to form a novolac resin occurs in the presence of an acid catalyst under acidic conditions. Suitable acid catalysts include oxalic acid, sulfuric acid, p-toluene sulfuric acid, hydrochloric acid, salicylic acid, all mineral acids and salts thereof. Mixed catalyst systems, such as ZnOAc/oxalic acid and other divalent metal compounds, preferably acetates, which are known in the prior art for preparing "high-ortho" novolacs—(Ex.: Ca, Mg, Zn, Cd, Pb, Cu, CO, Ni) may be used. Preferred catalysts include oxalic acid, sulfuric acid, p-toluene sulfonic acid, and ZnOAc/oxalic acid. Most preferably, the catalyst is oxalic acid or ZnOAc/oxalic acid.

Sufficient acid catalyst is added to catalyze the reaction between the phenol and formaldehyde to form the novolac resin, which amount is within the skill of the art.

The phenol/formaldehyde reaction may be conducted in about 1 to 6 hours, and generally is complete within 2 to 4 hours, at a temperature of about 80° to 100° C., and preferably 95° to 100° C. The reaction will usually occur at atmospheric pressure, although increased pressure may be utilized to permit the application of higher temperatures and, therefore, faster reaction rates and accordingly shorter reaction times. Typically, the reaction time is about 4 hours under atmospheric reflux conditions.

The resulting novolac resin is then treated to remove water and all other volatile organic materials by heating, such as by distillation. After this treatment, the free phenol should be about 0.001%–2.0%, preferably about 0.001%–0.5%.

Distillation of the resulting novolac can be performed at atmospheric pressure by heating up to 140° C., and then under a vacuum until the resin reaches a temperature of 180°–220° C. Distillation continues until most of the water, unreacted phenol, and other volatile organic materials are distilled off. Other suitable means to treat the resin by heating include thin-film evaporators.

The resulting molten novolac resin is then cooled to below 100° C. and, preferably, about 90° C. The novolac resin is still molten after being cooled.

The resulting molten novolac resin is then cooled to below 100° C. and, preferably, about 90° C. The novolac resin is still molten after being cooled.

If necessary, the molten novolac may then be neutralized. Neutralization is well within the state of the art and can be accomplished by the addition of a base, such as sodium hydroxide or potassium hydroxide, or its equivalent. The amount of base used to effect neutralization is approximately an equivalent amount of the acid used to generate the acid conditions present during the condensation reaction. It is preferred that the base be added in an amount sufficient to raise the pH to between about 5 to about 9, and most preferably to between about 6 to about 8 of the subsequent dispersion. Neutralization is not necessary when oxalic acid is used as the acid catalyst, since oxalic acid is a volatile organic material and is effectively removed during distillation of the resin.

Water and, optionally, a surfactant are then added to the cooled molten novolac, and the mixture is agitated to form a water-in-oil emulsion. Typically, about 10–30 wt % of water, based on the total resin solids, is added at this point. Preferably, about 20 wt % of water is added. Adding more than about 30 wt % of water at this point generally results in a phase separation which is not reversible.

If used, the surfactant is typically added together with the water as an aqueous solution. The surfactant can be any suitable surfactant such as lecithin, long chain ($C_{12}$–$C_{22}$) aliphatic acids or long chain ($C_{12}$–$C_{22}$) quaternary amines. Preferably the surfactant is lecithin. The amount of surfactant added is within the skill of the art. For example, when used, lecithin is added to produce in the resin an amount of lecithin from about 0 to 1.5 wt %, preferably 0 to 0.5 wt %, based on the novolac solids.

During addition of the water and optional surfactant, the resin is allowed to cool, preferably to between about 70° C. and 85° C.

At this point, a protective colloid is added to the emulsion. Such protective colloids include casein and polysaccharides, such as gum arabic, gum ghatti, gum tragacanth, guar gum, and hydroxypropyl guar.

The effective amount of protective colloid will vary depending on the particular protective colloid utilized, the presence of a surfactant, the molecular weight of the novolac resin, as well as the desired mean particle size. Generally, about 0.1 to about 8 wt %, based on the amount of novolac solids, preferably about 0.5 to about 5 wt %, and most preferably about 1 to about 2 wt % of protective colloid, is used.

Preferably, casein is used as the protective colloid and is added in an amount to produce an amount of casein present in the resin in an amount of from about 1 to 8 wt %, preferably about 1 to 5 wt %, based on the amount of novolac solids.

Additional water is then added, followed by agitation, to obtain the desired dispersion. The final dispersion preferably contains about 30–60 wt %, more preferably about 45–50 wt %, resin solids.

During the process of preparing the novolac resin dispersions of the present invention, a variety of other modifiers can be added into the novolac resin in order to improve toughness and other cured resin properties. These modifiers include, for example, chain terminating phenols, glycols, with or without halogen substitution for additional fire retardancy, polyester polyols, alkyl phenols, hydroxy-containing acrylates, and the like and mixtures thereof. Other modifiers, such as thickeners, fire retardants, lubricants, hardeners, defoamers, plasticizers, softening agents, pigments and fillers can be added to the novolac resin composition. Suitable thickeners, for example, include anionic polyacrylamide, guar gum, and hydrolyzed polyvinyl alcohol. The proportion of such modifiers incorporated into the novolac resin is within the skill of the art.

A preferred embodiment of the present invention contains:

Novolac resin solids=30–60 wt %, preferably 45–50 wt %.

Free phenol=0.001–2.0%, preferably 0.001–0.5%

Casein solids=1–8 wt %, preferably 1–5 wt %

Lecithin solids=0–1.5 wt %, preferably 0–0.5 wt %

Anionic polyacrylamide (thickener)=0–0.5 wt %, preferably 0–0.001 wt %

Particle size=0.1–20 microns, preferably 0.1–5 microns, most preferably 0.1–3 microns.

In a further embodiment, a cross-linking agent can be added during the process to make the ultimate dispersion capable of being cross-linked. Suitable cross-linking agents include phenolic/formaldehyde resole resins, hexamethylenetetramine, paraformaldehyde, trioxane, and other cross-linking agents known to those of skill in the art.

Preferred cross-linking agents are phenol/formaldehyde resoles and hexamethylenetetramine. These can be added directly to the novolac prior to emulsification/dispersion, as is the preferred method for hexamethylenetetramine, or they can be added to the final dispersed novolac in the binder preparation, as is the preferred method when a resole is used.

The amount of the cross-linking agent is within the skill of the art. For instance, in the case of a resole cross-linking agent, the ratio of reactants may be 1%–90% novolac to 99%–10% resole, respectively. Preferably the total resin solids in the final binder solutions is 20%, with 70%–90% being novolac and 30%–10% being resole, respectively.

The dispersed novolac resins of the present invention are particularly useful in preparing thermal insulation, such as a binder for glass fibers for glass insulation.

The particulate novolac resin may also be isolated from the dispersion using any known manner of isolating suspended particles. Such isolation can include filtration, such as by the use of vacuum filtration to obtain a cake containing 15 to 20 percent moisture, and drying, such as by the use of a rotary evaporator or fluid bed dryer to obtain less than 3 percent moisture. Alternatively, the dispersion can be spray-dried.

EXAMPLES

The invention will be further described by reference to the following examples. These examples should not be construed in any way as limiting the invention to anything less than that which is disclosed or which could have been obvious to anyone skilled in the art.

Example 1

ZnOAc/Oxalic Acid Mixed Catalyst 0.76 Mole Ratio Novoac Cook:

A 0.76 F/P mole ratio novolac resin was prepared by mixing 1.0 mole of phenol with 0.76 moles of formaldehyde. 0.007 mole of $ZnOAc.2H_2O$ was then added to the above solution and the pH was adjusted to 5.0–5.2. The reaction mixture was heated to 100° C. and held until the free formaldehyde concentration leveled off. The reaction was then cooled to 70° C. and 0.04 mole of oxalic acid was added. The reaction was then heated to reflux and held for 120 minutes. Distillation of the resulting novolac was performed atmospherically to a resin temperature of 140° C. and then under vacuum until a resin temperature of 180°–220° C. was obtained. The resulting distilled novolac was then cooled to 90° C., at which point a 7% solution of lecithin at 70° C. was slowly added to provide a mixture of 0.5 wt %–1.0 wt % lecithin based on novolac solids and to cool the resin further. The temperature of the resin mixture was allowed to cool further to between 70° C. and 85° C. Once all of the lecithin has been added, additional 70° C. water (30 wt % based on novolac solids) was added with good agitation. Casein was then added as a solution containing 83.85% water, 15.0% casein, 1.0% $NH_4OH$ (28%), and 0.15% NaOH (50%), in an amount to provide about 3%–8% casein based on novolac solids. The casein solution also was added with good agitation. The last of the water was then added with good agitation to form the final dispersion, which was 35–55% resin solids. Particle size, measured by the use of a light microscope, was estimated between <1–5 microns with a mean diameter of less than 3 microns.

Example 2

Oxalic Acid Catalyzed 0.70 mole ratio Novolac Cook:

A 0.7 F/P mole ratio novolac resin was prepared by mixing 1.0 mole of 100% phenol, 0.7 mole of 50% formaldehyde, and 0.005 mole of 100% oxalic acid. The mixture was heated to reflux for 4 hours. Distillation of the resulting novolac was performed atmospherically to 140° C. and then under vacuum until a temperature of 180°–220° C. was obtained. The resulting distilled novolac was then cooled to 90° C., at which point a 3% solution of lecithin at 70° C. was slowly added to provide a mixture containing 0.5 wt. %–1.0 wt. % lecithin based on novolac solids and to cool the resin further. The temperature of the resin mixture was allowed to cool further to between 70° C. and 85° C. Once all of the lecithin had been added, additional 70° C. water (30 wt. % based on novolac solids) was added with good agitation. Casein was then added as a solution containing 83.85% water, 15.0% casein, 1.0% NH$_4$OH (28%), and 0.15% NaOH (50%), in an amount to provide 3%–8% casein based on novolac solids. The casein solution also was added with good agitation. The last of the water was then added with good agitation to form the final dispersion, which was 35–55% resin solids. Particle size, measured by the use of a light microscope, was estimated between <1–5 microns with a mean diameter of less than 3 microns.

Example 3

Oxalic Acid Catalyzed 0.80 mole ratio Novolac Cook:

A 0.80 F/P mole ratio novolac resin was prepared by mixing 1.0 moles of phenol with 0.80 moles of formaldehyde as a 50% solution, followed by the addition of 0.005 moles of oxalic acid. The mixture was heated to reflux for 4 hours and distillation was performed as in the above example. Emulsification/dispersion was performed following the same procedure as above. Particle size, measured by the use of a light microscope, was estimated between <1–5 microns with a mean diameter of less than 3 microns.

Example 4

Oxalic Acid Catalyzed 0.78 Mole Ratio Novolac Cook:

A 0.78 F/P mole ratio novolac resin was prepared by mixing 1.0 moles of phenol with 0.78 moles of formaldehyde as a 50% solution, followed by the addition of 0.005 moles of oxalic acid. The mixture was heated to reflux for 4 hours and distillation was performed as in the above example. Emulsification/dispersion was performed following the same procedure as above. Particle size, measured by the use of a light microscope, was estimated between <1–5 microns with a mean diameter of less than 3 microns.

Example 5

Variations in Dispersing Agents:

(I) 0.70 M.R. (mole ratio), 0.78 M.R., and 0.80 M.R. novolac resins have all been dispersed without the use of lecithin. The dispersion procedure varies as follows:

The novolac was prepared as above using oxalic acid as the catalyst. After the distillation step was complete, the molten novolac was cooled to 120° C., at which point 20% water based on resin solids, preheated to 90° C., was added slowly with strong agitation. The temperature was allowed to fall to 80° C. After the initial 20% water addition was complete, casein was added as the above described solution to provide in an amount to provide about 3%–8% casein based on resin solids. The temperature of the novolac mixture was allowed to cool to 70° C. during the casein addition. The casein addition was followed by a final water addition, using water preheated to 70° C., to yield a stable dispersion which was 35%–55% resin solids. Particle size, measured by the use of a light microscope, was estimated between <1–5 microns with a mean diameter of less than 3 microns.

(II) Novolac resins prepared as in Example 5(I) (without the use of lecithin) were stabilized by the post-addition of an anionic polyacrylamide of high molecular weight. The polyacrylamide was added to the above dispersions after the final water addition and after the mixture had cooled to below 50° C. The resulting dispersions exhibited greater stability. Particle size, measured by the use of a light microscope, was estimated between <1–5 microns with a mean diameter of less than 3 microns.

(III) Example 2 was modified by the addition of 1.5% polyvinylacetate to enhance the stability of the dispersion. The polyvinylacetate was added after the final addition of water was complete and the temperature of the mixture reached 60° C. Particle size, measured by the use of a light microscope, was estimated between <1–5 microns with a mean diameter of less than 3 microns.

Example 6

The Addition of a Cross-Linking Agent Prior to Dispersion of the Novolac Resin:

Novolac resin dispersions prepared as described in Examples 5(I) and 5(II) have been prepared in the presence of hexamethylenetetramine at 3%, 5%, and 10% levels based on resin solids. The hexamethylenetetramine was added to the molten novolac prior to the addition of water and casein to provide a one component, self-curing system. Particle size, measured by the use of a light microscope, was estimated between <1–5 microns with a mean diameter of less than 3 microns.

Example 7

Binder Systems Prepared by the Addition of a Cross-Linking Agent to the Dispersed Novolac Resin:

The use of a phenol/formaldehyde resole and hexamethylenetetramine as cross-linking agents, in separate examples, for the dispersed novolac are demonstrated in the following examples:

(I) Binder solutions containing 15% resin solids, of which 10%, 20%, and 80% was a resole, based on resin solids, and 90%, 80%, and 20% was a dispersed novolac, respectively, based on resin solids, were prepared and cured using dispersed novolacs prepared from Examples 2, 4, 5(I) and 5(II).

(II) Binder solutions containing 15% resin solids, of which 100% was a dispersed novolac, as prepared in Examples 2, 4, 5(I) and 5(II), and 3%, 5%, 7%, and 10% hexamethylenetetramine was added, in separate examples, as a cross-linking agent, were prepared and cured.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A process for producing a dispersed particulate novolac resin comprising the steps in the following order of:
   (a) reacting a phenol with an aldehyde in the presence of a catalyst under acidic conditions to produce a novolac resin;
   (b) heating the novolac resin to remove water, unreacted phenol, and other volatile organic materials from the resulting novolac and to produce a molten novolac resin;

(c) cooling the molten novolac resin to a point where water can be added;

(d) adding about 10–30 wt % of water based on the total novolac resin solids and, optionally, a surfactant, to the molten resin, the water being added in an amount sufficient to produce a water-in-oil emulsion;

(e) adding a protective colloid to the emulsion in an amount sufficient to stabilize the dispersed particulate novolac resin; and (f) adding additional water and agitating to produce the dispersed particulate novolac resin, wherein the particulate novolac resin has a particle size of 0.1μ to 20μ.

2. The process of claim 1, wherein the phenol is hydroxybenzene and the aldehyde is formaldehyde.

3. The process of claim 1, wherein the acid catalyst is oxalic acid.

4. The process of claim 2, wherein the mole ratio of formaldehyde to phenol is about 0.5 to 0.95.

5. The process of claim 1, wherein the protective colloid is casein.

6. The process of claim 1, wherein a surfactant is present and is lecithin.

7. The process of claim 1, wherein after (b) heating the novolac resin to produce a molten novolac resin, the free phenol is 0.001–2.0%.

8. The process of claim 1, whereby the a particulate novolac resin has a particle size of 0.1μ to 5μ.

9. The process of claim 1, whereby the a particulate novolac resin has a particle size of 0.1μ to 3μ.

10. The process of claim 1, further comprising (g) adding a thickener to further stabilize the dispersed particulate novolac resin.

11. The process of claim 1, further comprising adding a cross-linking agent in (c) or after producing the dispersed particulate novolac resin.

* * * * *